United States Patent [19]

Matsuda et al.

[11] 3,991,026

[45] Nov. 9, 1976

[54] PROCESS FOR THE PREPARATION OF ANIONIC THERMOSETTING RESIN EMULSIONS

[75] Inventors: Kazuo Matsuda; Hidemasa Ohmura; Hirakazu Aritaki, all of Wakayama, Japan

[73] Assignee: Kao Soap Co., Ltd., Tokyo, Japan

[22] Filed: Feb. 3, 1975

[21] Appl. No.: 546,732

[30] Foreign Application Priority Data
Feb. 15, 1974 Japan............................ 49-18222

[52] U.S. Cl. ................... 260/29.2 TN; 260/75 NM; 260/77.5 AQ; 260/77.5 Q
[51] Int. Cl.$^2$ ................. C08G 18/83; C08G 18/32
[58] Field of Search ............. 260/29.2 TN, 77.5 Q, 260/29.2 TN

[56] References Cited
UNITED STATES PATENTS

| | | | |
|---|---|---|---|
| 3,294,752 | 12/1966 | Wilkinson | 260/77.5 Q |
| 3,372,085 | 3/1968 | Westfall et al. | 260/77.5 Q |
| 3,384,606 | 5/1968 | Dieterich et al. | 260/29.2 TN |
| 3,388,087 | 6/1968 | Dieterich et al. | 260/29.2 TN |
| 3,419,533 | 12/1968 | Dieterich | 260/29.2 TN |
| 3,461,103 | 8/1969 | Keberle et al. | 260/75 |
| 3,491,050 | 1/1970 | Keberle et al. | 260/77.5 Q |
| 3,836,493 | 9/1974 | Matsuda et al. | 260/29.2 TN |
| 3,892,696 | 7/1975 | Wood | 260/29.2 TN |

*Primary Examiner*—Murray Tillman
*Assistant Examiner*—A. H. Koeckert
*Attorney, Agent, or Firm*—Woodhams, Blanchard and Flynn

[57] ABSTRACT

A process for the preparation of anionic thermosetting resin emulsions, comprising the steps of (1) reacting an isocyanate-terminated urethane prepolymer with an excess of a polyalkylene-polyamine to form a polyurethane-urea-polyamine, (2) then reacting the thus-formed polyurethane-urea-polyamine with an epihalohydrin, (3) reacting the resulting reaction product of step (3) with a cyclic dicarboxylic acid anhydride, and then (4) mixing the resulting reaction product of step (3) with an aqueous solution of a basic substance to form an emulsion.

8 Claims, No Drawings

PROCESS FOR THE PREPARATION OF ANIONIC THERMOSETTING RESIN EMULSIONS

BACKGROUND OF THE INVENTION

1. Field of the Invention

This invention relates to a process for the preparation of thermosetting resin emulsions. More particularly, this invention relates to a process for the preparation of a homogeneous, stable, self-emulsified, anionic, polyurethane emulsion.

2. Description of the Prior Art

As conventional methods for preparing polyurethane emulsions, there are known a method comprising emulsifying and suspending a polyurethane composition in water in the presence of an emulsifier, and a method for preparing an emulsifier-free polyurethane emulsion by forming a composition of a polyurethane containing a tertiary amino group by using an active hydrogen compound containing a tertiary amino group, and quaternizing said amino group or mixing said polyurethane composition with an aqueous solution of an acid, and the like.

It is also known that a self-emulsifiable polyurethane emulsion can be obtained by reacting a composition of a polyurethane containing free primary and/or secondary hydroxyl groups and/or amino groups with a salt or a 3- to 7-membered cyclic compound containing a group capable of forming a salt on ring-opening.

Conventional methods using an emulsifier are disadvantageous in that because a large quantity of an emulsifier is generally employed, the resulting emulsion product is expensive. Moreover, because the emulsifier destroys the emulsion on application or has bad influences on the properties of the product obtained after drying, the fields of use of emulsions prepared by these methods are extremely limited.

In the prior art methods comprising converting the tertiary amino group contained in a polyurethane composition to an acid salt or quaternizing such tertiary amino group, or the prior art methods comprising reacting free hydroxyl and/or amino groups in a polyurethane composition with a salt or a 3- to 7-membered cyclic compound containing a group capable of forming a salt on ring-opening, when the molecular weight of the polyurethane is increased to such an extent that products having good mechanical properties can be obtained, the stability of the polyurethane emulsion is lowered and the emulsion frequently becomes heterogeneous. In contrast, in these conventional methods, when the molecular weight of the polyurethane is decreased so as to obtain a stable emulsion, the tensile strength and elongation of the resulting polyurethane resin are drastically lowered. Thus, in these conventional methods, there is inevitably observed the disadvantage that the stability of the emulsion and the mechanical properties of the resulting polyurethane resin are contradictory to each other, that is, one cannot be increased without simultaneously decreasing the other, and vice versa.

We previously invented a cationic polyurethane emulsion of the self-crosslinking type (Japanese Laid Open Patent Application Publication No. 33141/72) as an emulsion overcoming the foregoing disadvantages present in the conventional techniques. In general, polymer latices are used in the state of admixture with other latices, fillers, modifiers and other additives, and in order to attain good stability and compatibility in the resulting mixed latices, polymer latices differing in their ionic characteristics are chosen and mixed.

Accordingly, the development of cationic, anionic, amphoteric and non-ionic polyurethane emulsions of both the self-emulsifiable type and the self-crosslinking type is of great industrial significance.

As an effective method for imparting a self-crosslinking property to a polyurethane resin, there can be mentioned a method using as a chain extender for urethane prepolymers a polyalkylene-polyamine (I) having as functional groups at least two primary or secondary amino groups and a group $-CH_2-CH(OH)-CH_2X$, in which X is Cl or Br, which is prepared by adding an epihalohydrin to a polyalkylene-polyamine. However, the compound (I) is readily changed with the passage of time depending on its structure, and the reaction conditions must be strictly controlled in the reaction of adding the epihalohydrin to the polyalkylene-polyamine or the reaction of chain-extending the urethane prepolymer by the compound (I). Accordingly, when urethane prepolymers having specific structural features are used, it is difficult to produce a polyurethane emulsion in a large quantity with good reproducibility. In some cases, such disadvantages as reduced stability of the polyurethane emulsion obtained according to this method or of a latex formed by mixing such polyurethane emulsion with other polymer latices is brought about.

SUMMARY OF THE INVENTION

We have discovered that a stable, anionic, self-emulsified, self-crosslinking emulsion containing a polyurethane resin possessing excellent tensile strength, elongation and other mechanical properties, is obtained by (1) reacting (A) an isocyanate-terminated urethane prepolymer formed from a polyhydroxyl compound and an excess of a polyisocyanate, with (B) an excess of a polyalkylene-polyamine to form a polyurethane-urea-polyamine, then (2) reacting the thus-formed polyurethane-urea-polyamine with an epihalohydrin, (3) reacting the resulting reaction product of step (2) with a cyclic dicarboxylic acid anhydride and (4) mixing the resulting reaction product of step (3) with an aqueous solution of a basic substance.

The polyurethane resin obtained by drying the polyurethane emulsion obtained according to the process of this invention undergoes a thermosetting reaction when it is heat-treated, thereby to form cross-linkages in the polyurethane resin, resulting in improvements of its physical properties such as those mentioned above. Accordingly, in the polyurethane emulsion of this invention, it is unnecessary to increase excessively the molecular weight of the polymer in the emulsion in order to improve such physical properties, and hence, a very good emulsion stability can be attained simultaneously with good physical properties in the polyurethane emulsion of this invention.

According to this invention, therefore, a stable emulsion containing a polyurethane resin having excellent physical properties can readily be obtained.

The polyurethane-urea-polyamine used for the preparation of the composition of this invention is obtained by reacting (A) an isocyanate-terminated urethane prepolymer formed from a polyhydroxyl compound and an excess of a polyfunctional isocyanate, with (B) a polyalkylene-polyamine preferably in a solvent of the ketone type, such as acetone or methyl ethyl ketone.

As the polyfunctional isocyanate, there can be used aromatic, alicyclic and aliphatic diisocyanates such as, for example, 1,5-naphthylene diisocyanate, 4,4'-diphenylmethane diisocyanate, 4,4'-diphenyldimethylmethane diisocyanate, di- and tetra-alkyldiphenylmethane diisocyanates, 4,4'-dibenzyl isocyanate, 1,3-phenylene diisocyanate, 1,4-phenylene diisocyanate, tolylene diisocyanate, chlorinated isocyanates, phosphorus-containing isocyanates, butane-1,4-diisocyanate, hexane-1,6-diisocyanate, dicyclohexylmethane diisocyanate, cyclohexane-1,4-diisocyanate, xylylene diisocyanate and lysine diisocyanate. In addition, triisocyanates such as 1-methylbenzole-2,4,6-triisocyanate, biphenyl-2,4,4'-triisocyanate and triphenylmethane triisocyanate can be used in combination with the foregoing diisocyanates.

The polyhydroxyl compound used for the preparation of the urethane prepolymer in this invention includes those having a molecular weight of from 200 to 10,000. Any of the known polyhydroxyl compounds customarily used for the preparation of polyurethanes, such as polyethers, polyesters, polyester amides, polyacetals, polythioethers and polybutadiene glycols can be used in this invention.

As the polyethers that can be used as the polyhydroxyl compound, there can be mentioned, for example, homopolymers, copolymers and graft copolymers of tetrahydrofuran, ethylene oxide, butylene oxide and the like.

It is also possible to use homogeneous or mixed polyethers formed by condensation of hexane diol, methylhexane diol, heptane diol and octane diol. Still further, glycols such as bisphenol A and adducts formed by adding ethylene oxide, propylene oxide or the like to bisphenol A can be used. In addition, propoxylated and ethoxylated glycols can be used.

As the polythioether that can be used as the polyhydroxyl compound, condensation products of thioglycols alone or together with other glycols are preferred.

As the polyacetals, there can be mentioned, for example, water-insoluble polyacetals prepared from hexane diol and formaldehyde or from 4,4'-dihydroxyethoxydiphenyldimethylmethane and formaldehyde.

As typical examples of the polyester, there can be mentioned polyester glycols formed by dehydrating condensation of saturated and unsaturated low-molecular weight glycols such as ethylene glycol, propylene glycol, 1,3-butane diol, 1,4-butane diol, neopentyl glycol, pentane diol, hexane diol, octane diol, 2-ethyl-1,3-hexane diol, 1,4-butyne diol, bisphenol A, diethylene glycol, triethylene glycol and dipropylene glycol, with dibasic acids, and polyester glycols obtained by ring-opening polymerization of cyclic ester compounds.

If necessary, glycols customarily used in this field, such as ethylene glycol, diethylene glycol, triethylene glycol, butane diol, propane diol, 1,6-hexane diol, neopentyl glycol and N-alkyldiethanolamines containing an alkyl group having 1 to 22 carbon atoms, can be used in combination with the above-mentioned polyhydroxyl compounds.

The preparation of the isocyanate-terminated urethane prepolymer used in this invention is performed in the presence or absence of a solvent. When an aromatic polyisocyanate is used for reaction with the polyhydroxyl compound, a reaction temperature of 50° to 100° C. is adopted, and when an aliphatic or alicyclic polyisocyanate is used, a reaction temperature of 70° to 130° C. is employed.

In the preparation of the isocyanate-terminated urethane prepolymer, it is preferred that the amount of the polyisocyanate is selected so that all of the hydroxyl groups are reacted completely with the isocyanate groups.

More specifically, it is preferred that the ratio of the total number of mols of the isocyanate groups to the total number of moles of reactive hydrogen atoms (—OH groups) is with a range of from 1.1 : 1.0 to 5.0 : 1.0.

As the polyalkylene-polyamine used in this invention, there can be mentioned, for example, polyalkylene polyamines such as polyethylene polyamine, polypropylene polyamine and polybutylene polyamine.

More specifically, the polyalkylene-polyamine to be used in this invention includes those in which the nitrogen atoms are connected via —$(CH_2)_n$— groups where $n$ is an integer larger than 1, and usually from 2 to about 4 of such groups are present in the molecule.

In such polyalkylene-polyamines, the nitrogen atoms can be bonded to adjacent carbon atoms of the —$(CH_2)_n$— groups, but two nitrogen atoms are not bonded to the same carbon atoms.

The polyalkylene-polyamines have the formula

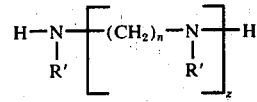

wherein $n$ is as defined above, $z$ is an integer from 2 to 4, and R', which can be the same or different, is hydrogen, alkyl having 1 to 4 carbon atoms, or hydroxyalkyl having 1 to 4 carbon atoms.

Specific examples of the polyalkylene-polyamines include diethylene triamine, triethylene tetramine, tetraethylene pentamine, dipropylene triamine, mixtures thereof and various purified polyamine materials. Further, hydroxyalkyl-substituted polyamines can be used in this invention.

In some cases, in order to change the density of the hydrophilic groups in the polyurethane emulsion obtained according to this invention or to improve the properties of the polyurethane resin, it is preferred to change or increase the distance between the amino groups in the polyurethane-urea-polyamine molecule. This can be accomplished by replacing a part of the polyalkylene-polyamine used by ethylene diamine, propylene diamine, hexamethylene diamine, piperazine phenylene diamine, an alkyl (having 1 to 22 carbon atoms) substitution product of such diamine, an alkylene oxide adduct of such diamine, an acrylonitrile adduct of such diamine, an acrylic acid ester adduct of such diamine or the like.

For attaining this object, it is generally preferred that up to about 50 molar percent of the polyalkylenepolyamine be replaced by the diamine.

It is preferred that the reaction between the isocyanate-terminated urethane prepolymer and the polyalkylene polyamine be carried out at a reaction temperature of —20° to +70° C. under atmospheric pressure in a solvent of the ketone type.

As the ketone type solvent, there can be mentioned acetone, methylethyl ketone, diethyl ketone, dipropyl ketone, methylisobutyl ketone and the like. Use of acetone and methylethyl ketone is especially preferred.

A solvent mixture of such ketone type solvent with benzene, tetrahydrofuran, dioxane, ethyl acetate, dimethylformamide or a chlorinated hydrocarbon type solvent can also be used.

The reaction time is determined depending on the reaction temperature and the reactivity of the polyisocyanate compound, and a shorter or longer reaction time is adopted under various reaction conditions. The termination of the reaction is confirmed by the fact that no absorption owing to the isocyanate group is observed at 2250 cm$^{-1}$ in the infrared absorption spectrum of the reaction mixture. In general, the reaction is completed in 0.5 to 2 hours.

In the reaction between the urethane prepolymer and the polyalkylene-polyamine, it is critical that the total number of the primary and secondary amino groups should be in excess in relation to the total number of the isocyanate groups in the urethane prepolymer. As the total mole number of the amino groups becomes close to the total mole number of the isocyanate groups, a polyurethane-urea-polyamine of a high molecular weight is formed, and a gelled product or a product having a great tendency to become gelated is formed. When the ratio of the total mole number of the amino groups to isocyanate groups, is too high, the molecular weight of the polyurethane-urea-polyamine is so low that a resin having excellent physical properties cannot be prepared when a polyurethane emulsion is formed by using such low-molecular-weight polyurethane-urea-polyamine as the intermediate.

In view of the foregoing, it is preferred that the ratio of the total number (B) of moles of the primary and secondary amino groups in the polyalkylene-polyamine to the total number (A) of moles of the isocyanate groups in the isocyanate-terminated urethane prepolymer be within a range of $1 < B/A \leq 5$, especially $1 < B/A \leq 3$. It is also preferred that the molecular weight of the polyurethane-urea-polyamine be within a range of from 5,000 to 100,000.

In order to impart a self-crosslinking property to the urethane resin in an anionic polyurethane emulsion prepared by using, as the intermediate, the thus-formed polyurethane-urea-polyamine, this polyurethane-urea-polyamine is reacted with an epihalohydrin in an amount of 0.2 to 1.0 mole of said epihalohydrin per mole of the primary or secondary amino groups of the polyurethane-urea-polyamine. It is preferred to use epichlorohydrin and epibromohydrin as the epihalohydrin. The conditions for this reaction vary depending on the kind of the polyurethane-urea-polyamine employed, but, in general, the reaction is carried out at a temperature of 20° to 70° C. for 0.5 to 5 hours. The cross-linkage density can be varied by varying the mixing weight of the epihalohydrin.

The thus-formed product is converted to a polyurethane emulsion by the following method.

Namely, the product is reacted with cyclic dicarboxylic anhydride at 5° to 70° C. for about 0.5 to about 2 hours, said anhydride being generally employed in a number of moles equivalent to the number of moles of the primary and secondary amino groups included in said product. The resulting reaction product is mixed with an aqueous solution of a basic substance, whereby an anionic polyurethane emulsion is formed.

The organic solvent used for the reaction can be distilled off from the thus-prepared anionic polyurethane emulsion, preferably under reduced pressure. Even if the organic solvent is distilled off, the stability of the emulsion is not degraded at all.

Typical examples of the cyclic dicarboxylic acid anhydride used in this invention include maleic anhydride, succinic anhydride, phthalic anhydride, dihydrophthalic anhydride, tetrahydrophthalic anhydride, hexahydrophthalic anhydride, trimellitic anhydride and itaconic anhydride.

As the aqueous solution of a basic substance used to form the emulsion, there can be employed aqueous solutions of alkali metal hydroxides, carbonates and bicarbonates such as sodium hydroxide, potassium hydroxide, lithium hydroxide, sodium carbonate, sodium bicarbonate and potassium carbonate, ammonia, and lower amines represented by the formulas $RNH_2$, $R_2NH$ or $R_3N$, in which R is selected from the group consisting of alkyl having 1 to 4 carbon atoms, hydroxyethyl and hydroxypropyl. The basic substance is added in an amount sufficient to adjust the pH of the emulsion to from about 6 to about 9.

The thus-prepared self-emulsified and self-crosslinking emulsion containing generally 5 to 50 weight percent of the polyurethane resin is applied to fibrous materials, non-woven fabrics, papers, leather, rubbers, woods, metals, concrete, gypsum, glass, glass fibers and plastics by the immersion treatment or by the coating or spraying treatments, followed by drying, whereby there is obtained the effects of improved touch, improved bondability and improved surface coating of these substrate materials. Further, the emulsion of this invention can be used for production of construction materials and as adhesives and the like.

The polyurethane emulsion prepared according to the process of this invention is a so-called self-emulsified emulsion free of an emulsifier. However, in order further to improve the emulsion stability of the product, it is possible to add a known emulsifier, provided that the properties of the polyurethane resin are not drastically changed thereby.

This invention will now be described in more detail by reference to the following illustrative Examples that by no means limit the scope of this invention. In these Examples, all references to "parts" and "percent" are by weight unless otherwise indicated.

EXAMPLE 1

90 Parts of benzene and 34.8 parts of an 80 : 20 mixture of 2,4-tolylene diisocyanate and 2,6-tolylene diisocyanate were added to 202 parts of dehydrated polytetramethylene ether glycol (having a hydroxyl value of 55.3), and the mixture was heated under agitation at 80° C. for 1 hour and then was cooled to room temperature to obtain a solution of a urethane prepolymer having a residual isocyanate content of 2.5 percent.

Separately, a 4-neck flask was charged with 250 parts of methylethyl ketone and 3.83 parts of diethylene triamine, and the mixture was agitated while maintaining the temperature below 10° C. by external ice cooling. In this state, 100 parts of the above prepolymer solution was gradually added dropwise to the mixture over a period of 2 hours, to form a solution of a polyurethane-urea-polyamine.

Then 4.80 parts of epichlorohydrin dissolved in 30 parts of methylethyl ketone was added to the polyurethane-urea-polyamine solution, and the reaction was carried out at 50° C. for 1 hour under agitation. Subsequently, 5.10 parts of maleic anhydride dissolved in 50 parts of methylethyl ketone was added to the reaction mixture under vigorous agitation at a temperature not exceeding 10° C., and the temperature of the reaction mixture was gradually elevated to 60° C. over a period of about 1 hour to complete the reaction. Then, 2.1 parts of sodium hydroxide in 200 parts of water was added to the reaction mixture and the mixture was blended to a homogeneous state. Benzene and methylethyl ketone were distilled off from the mixture at 60° C. under reduced pressure and water was added to adjust the concentration in the resulting emulsion.

Thus, there was obtained a low viscosity, stable emulsion having a resin content of 25 percent.

When the thus-prepared emulsion was air-dried, a uniform transparent rubbery film was obtained, and when the film was heat-treated at 120° C. for 20 minutes, the physical properties were improved as shown below:

|  | Air-Dried Product | Heat-Treated Product |
|---|---|---|
| Tensile strength ($Kg/cm^2$) | 72 | 248 |
| 100 % Modulus ($Kg/cm^2$) | 17.0 | 20.5 |
| 300 % Modulus ($Kg/cm^2$) | 21.2 | 29.3 |
| Elongation (%) | 850 | 710 |

The heat-treated product was swollen by contact with dimethylformamide but it was not dissolved therein, whereas the air-dried product completely dissolved in dimethylformamide.

COMPARATIVE EXAMPLE 1

The polyurethane-urea-polyamine solution prepared in Example 1 was reacted directly with maleic anhydride in the same manner as in Example 1 without reacting it with epichlorohydrin. After completion of the reaction, an aqueous solution of sodium hydroxide was added to the reaction mixture and the organic solvents used were distilled off to obtain an emulsion.

In the same manner as in Example 1, a rubbery film was prepared from the thus-obtained emulsion (having a resin content of 25 percent). The film had the physical properties as shown below.

|  | Air-Dried Product | Heat-Treated Product |
|---|---|---|
| Tensile strength ($Kg/cm^2$) | 71 | 204 |
| 100 % Modulus ($Kg/cm^2$) | 16.5 | 19.5 |
| 300 % Modulus ($Kg/cm^2$) | 20.0 | 26.2 |
| Elongation (%) | 860 | 727 |

Both the air-dried product and the heat-treated product dissolved in dimethylformamide.

When the results of Example 1 (the process of this invention) are compared with the results of Comparative Example 1, it will readily be understood that a polyurethane emulsion film prepared according to the process of this invention has excellent mechanical and chemical properties.

EXAMPLE 2

A urethane prepolymer having a terminal isocyanate group content of 8.56 percent was prepared by reacting 310.8 parts of dehydrated polyoxypropylene glycol with 4.08 parts of trimethylolpropane and 146.8 parts of an 80 : 20 mixture of 2,4-tolylene diisocyanate and 2,6-tolylene diisocyanate at 80° C. for 3 hours.

Separately, a flask was charged with 47.2 parts of diethylene triamine and 956 parts of methylethyl ketone. Then, 382.4 parts of the above urethane prepolymer diluted with 95.6 parts of methylethyl ketone was added dropwise to the mixture at 5° to 7° C. over a period of 1 hour, and the reaction was then conducted at 50° C. for 30 minutes. A small amount of the resulting solution was sampled and subjected to an infrared absorption spectrum analysis. In the absorption spectrum, there was observed no absorption owing to the isocyanate group at 2250 $cm^{-1}$.

7.7 Parts of epichlorohydrin dissolved in 30 parts of methylethyl ketone was added to 270 parts of the thus-formed polyurethane-urea-polyamine solution, and the reaction was carried out at 50° C. for 1 hour. Then, 10.4 parts of maleic anhydride was added to the reaction mixture and the reaction was conducted at 50° C. for 30 minutes.

Subsequently, a solution of 4.24 parts of sodium hydroxide in 350 parts of water was added to the reaction mixture and methylethyl ketone was distilled off under reduced pressure to obtain a low viscosity, homogeneous and stable emulsion having a resin content of 10 percent.

The mechanical properties of a film prepared from this emulsion in the same manner as in Example 1 were as shown below.

|  | Air-Dried Product | Heat-Treated Product |
|---|---|---|
| Tensile strength ($Kg/cm^2$) | 78 | 142 |
| 100 % Modulus ($Kg/cm^2$) | 52 | 55 |
| 300 % Modulus ($Kg/cm^2$) | 70 | 83 |
| Elongation (%) | 350 | 370 |

COMPARATIVE EXAMPLE 2

10.4 parts of maleic anhydride was added to 270 parts of the polyurethane-urea-polyamine solution prepared in Example 2, and the reaction was carried out at 50° C. for 30 minutes.

Subsequently, in the same manner as in Example 2, a solution of 4.24 parts of sodium hydroxide in 350 parts of water was added to the reaction mixture, and methylethyl ketone was distilled off under reduced pressure to obtain an emulsion having a resin content of 10 percent.

The mechanical properties of a film prepared from this emulsion in the same manner as in Example 1 were as shown below.

|  | Air-Dried Product | Heat-Treated Product |
|---|---|---|
| Tensile strength ($Kg/cm^2$) | 74 | 98 |
| 100 % Modulus ($Kg/cm^2$) | 50 | 54 |
| 300 % Modulus ($Kg/cm^2$) | 68 | 81 |
| Elongation (%) | 330 | 320 |

When the results of Example 2 (the process of this invention) are compared with the results of Comparative Example 2, it will readily be understood that a polyurethane emulsion film prepared according to the process of this invention has excellent mechanical properties.

EXAMPLE 3

A solution of urethane prepolymer having a terminal isocyanate group content of 4.32 percent was prepared by reacting 984 parts of a hydroxyl-terminated polyester glycol (having a hydroxyl value of 114.0) formed by dehydrating condensation of 1,4-butane diol and adipic acid, with 376 parts of xylylene diisocyanate in 583 parts of benzene at 80° C. for 4 hours.

Separately, 15.6 parts of diethylene triamine dissolved in 500 parts of methylethyl ketone was charged in a flask. Then, 250 parts of the above urethane prepolymer solution was added dropwise to the charge in the flask at about 28° C. over a period of about 30 minutes, and the reaction was conducted at 50° C. for 40 minutes.

Subsequently, 14.0 parts of epichlorohydrin was added to the reaction mixture, and the reaction was conducted at 60° C. for 1 hour. Then, 29.4 parts of phthalic anhydride was added to the reaction mixture and the reaction was conducted at 50° C. for 30 minutes. Then, a solution of 8 parts of sodium hydroxide in 940 parts of water was added to the reaction mixture and mixed therewith. The organic solvents used were distilled off under reduced pressure and the concentration was adjusted by addition of water to obtain an emulsion having a resin content of 20 percent.

A heat-treated film product prepared from this emulsion in the same manner as in Example 1 had the physical properties as shown below:
  100 % Modulus : 28 Kg/cm$^2$
  300 % Modulus : 81 Kg/cm$^2$
  Tensile strength : 249 Kg/cm$^2$
  Elongation : 600 %

EXAMPLE 4

The procedures of Example 3 were repeated in the same manner except that 23.8 parts of epibromohydrin was used instead of epichlorohydrin, to obtain a homogeneous and stable emulsion having a resin content of 20 percent.

The mechanical properties of a heat-treated film product prepared from this emulsion in the same manner as in Example 1 were shown below:
  100 % Modulus : 29 Kg/cm$^2$
  300 % Modulus : 84 Kg/cm$^2$
  Tensile strength : 240 Kg/cm$^2$
  Elongation : 590 %

EXAMPLE 5

A round-bottom flask equipped with an agitator and a thermometer was charged with 2011 parts of a hydroxyl-terminated polyester glycol (having a hydroxyl value of 55.8) prepared from adipic acid and ethylene glycol by dehydrating condensation, 1150 parts of benzene and 672 parts of hexamethylene diisocyanate, and they were reacted at 70° C. for 5 hours to obtain a solution of urethane prepolymer having a terminal isocyanate group content of 6.57 percent.

Another flask was charged with 182 parts of diethylene triamine and 3833 parts of methylethyl ketone, and while the inside temperature was maintained at 5° to 7° C. by external ice cooling, 1917 parts of the above urethane prepolymer solution was added dropwise to the mixture over a period of 2 hours. Then, the reaction was carried out at 50° C for 30 minutes.

Subsequently, 213 parts of epichlorohydrin was added to the reaction mixture, and the reaction was conducted at 50° C. for 1 hour. Then, a solution of 230 parts of succinic anhydride in 1000 parts of methylethyl ketone was added to the reaction mixture, and the reaction was conducted at 50° C. for 30 minutes. After completion of the reaction, a solution of 92 parts of sodium hydroxide in 6176 parts of ion-exchanged water was added to the reaction mixture. The resulting mixture was heated and agitated at 50° C. under reduced pressure to distill off the organic solvents used, and the concentration was adjusted by addition of water to obtain a homogeneous emulsion having a resin content of 25 percent. The mechanical properties of a heat-treated film product prepared from this emulsion in the same manner as in Example 1 were as shown below:
  100 % Modulus : 32 Kg/cm$^2$
  300 % Modulus : 97 Kg/cm$^2$
  Tensile strength : 234 Kg/cm$^2$
  Elongation : 580 %

EXAMPLE 6

A solution of a urethane prepolymer having a terminal isocyanate group content of 0.96 percent was prepared by reacting 101.8 parts of dehydrated polytetramethylene ether glycol (having a hydroxyl value of 110.2) with 20.9 parts of an 80 : 20 mixture of 2,4-tolylene diisocyanate and 2,6-tolylene diisocyanate in 52.3 parts of benzene at 80° C. for 4 hours. A solution of 2.2 parts of diethylene triamine in 280 parts of methylethyl ketone was charged in another flask, and 140 parts of the above urethane prepolymer solution was added thereto dropwise at 10° to 13° C. over a period of 20 minutes and the reaction was conducted at 50° C. for 30 minutes.

Subsequently, 3.0 parts of epichlorohydrin was added to the reaction mixture, and the reaction was carried out at 50° C. for 1 hour. Then, a solution of 3.1 parts of maleic anhydride in 40 parts of methylethyl ketone was added to the reaction mixture, and the reaction was further conducted at 50° C. for 30 minutes. After completion of the reaction, 4.0 parts of 28 percent aqueous ammonia and 420 parts of water were added to the reaction mixture and mixed sufficiently therewith. Benzene and methylethyl ketone were distilled off from the resulting reaction mixture under reduced pressure and the concentration was adjusted by addition of water to obtain a homogeneous and stable emulsion having a resin content of 20 percent. The mechanical properties of a heat-treated film product prepared in the same manner as in Example 1 were as shown below:
  100 % Modulus : 24 Kg/cm$^2$
  300 % Modulus : 69 Kg/cm$^2$
  Tensile strength : 208 Kg/cm$^2$
  Elongation : 630 %

EXAMPLE 7

A solution of a urethane prepolymer having a terminal isocyanate group content of 2.37 percent was prepared by reacting 198.2 parts of dehydrated polytetramethylene ether glycol (having a hydroxyl value of 56.6) with 50 parts of diphenylmethane-4,4'-diisocyanate in 106 parts of methylethyl ketone at 70° C. for 2.5 hours.

A solution of 816 parts of triethylene tetramine in 355 parts of methylethyl ketone was charged in another flask, and while the inside temperature was maintained at 8° to 10° C. by external cooling, 178 parts of the above urethane prepolymer solution was added dropwise to the charge in the flask over a period of 40 minutes. After completion of the dropwise addition, the reaction was carried out at 50° C. for 30 minutes.

Subsequently, 18.5 parts of epibromohydrin was added to the reaction mixture, and the reaction was conducted at 50° C. for 1 hour. Then, a solution of 13.5 parts of succinic anhydride in 100 parts of methylethyl ketone was added to the reaction mixture, and the reaction was further conducted at 50° C. for 30 minutes. After completion of the reaction, 16.9 parts of 28 percent aqueous ammonia and 500 parts of water were added to the reaction mixture, and methylethyl ketone was distilled off under reduced pressure and the concentration was adjusted by addition of water to obtain a homogeneous emulsion having a resin content of 25 percent. The mechanical properties of a heat-treated film product prepared in the same manner as in Example 1 were as shown below:

100 % Modulus : 28 Kg/cm²
300 % Modulus : 71 Kg/cm²
Tensile strength : 236 Kg/cm²
Elongation : 580 %

The embodiments of the invention in which an exclusive property or privilege is claimed are defined as follows:

1. A process for preparing an anionic thermosetting polyurethane emulsion, which comprises:
   1. reacting, in the liquid phase and in a ketone solvent, at a temperature of from −20° to −70° C., (A) isocyanate-terminated urethane prepolymer prepared by reacting organic polyol having a molecular weight in the range of from 200 to 10000 with an excess of organic polyisocyanate, with (B) an excess of polyalkylene polyamine having at least two primary or secondary amino groups, the total mole number of primary and secondary amino groups in the polyalkylene polyamine being greater than the total mole number of isocyanate groups in the isocyanate-terminated urethane prepolymer, the reaction being carried out until the presence of —NCO groups cannot be detected, whereby to form polyurethane-urea-polyamine,
   2. reacting, in the liquid phase, the reaction product of step 1 with an epihalohydrin, at a temperature of +20° to +70° C., for 0.5 to 5 hours, the amount of said epihalohydrin being in the range of from 0.2 to 1.0 moles per mole of the primary and secondary amino groups of said polyurethane-urea-polyamine,
   3. reacting, in the liquid phase, at a temperature of from 5° to 70° C., for from 0.5 to 2 hours, the reaction product of step 2 with cyclic dicarboxylic acid anhydride in an amount substantially equimolar to the amino groups of said polyurethane-urea-polyamine,
   4. adding to the reaction product of step 3 an aqueous solution of a basic substance to adjust the pH of the product of step 3 to be in the range of about 6 to about 9, and
   5. treating the product of step 4 to remove the organic solvent therefrom and thereby obtaining an aqueous anionic polyurethane emulsion as a final product.

2. A process according to claim 1, in which the reactant (B) includes up to 50 percent, by molecular equivalent, of diamines, or alkyleneoxide adducts, acrylonitrile adducts or acrylate adducts of diamines.

3. A process according to claim 1, in which the ratio of (b) the total mole number of amino groups containing active hydrogen atoms in the polyalkylene polyamine, to (a) the total mole number of isocyanate groups in said urethane prepolymer is in the range of $1 = b/a \leq 5$.

4. A process according to claim 1, in which said polyalkylene polyamine has the formula

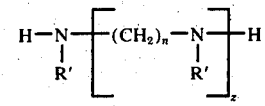

wherein $n$ is an integer larger than 1, $z$ is an integer from 2 to 4 and R′ is hydrogen, alkyl having 1 to 4 carbon atoms or hydroxylalkyl having 1 to 4 carbon atoms.

5. A process according to claim 1, in which said cyclic dicarboxylic acid anhydride is selected from the group consisting of maleic anhydride, succinic anhydride, phthalic anhydride, dihydrophthalic anhydride, tetrahydrophthalic anhydride, hexahydrophthalic anhydride, trimellitic anhydride and itaconic anhydride.

6. A process according to claim 1, in which said basic substance is selected from the group consisting of alkali metal hydroxides, carbonates and bicarbonates, ammonia and water soluble amines of the formula RHN₂, R₂NH and R₃N wherein R is alkyl of 1 to 4 carbon atoms, hydroxyethyl or hydroxypropyl.

7. An aqueous anionic polyurethane emulsion prepared by the process of claim 1. heat-treating 8. A polyurethane molded product prepared by forming the emulsion of claim 7 into a molded product and then heattreating the product to effect cross-linking.

* * * * *

UNITED STATES PATENT AND TRADEMARK OFFICE
CERTIFICATE OF CORRECTION

PATENT NO. : 3,991,026
DATED : November 9, 1976
INVENTOR(S) : Kazuo Matsuda, Hidemasa Ohmura and Hirakazu Aritaki It is certified that error appears in the above-identified patent and that said Letters Patent are hereby corrected as shown below:

Column 11, line 30; change "-70°C." to ---+70°C.---.

Column 12, line 22; change "= b/a $\leq$ 5" to ---< $\frac{b}{a}$ $\leq$ 5---.

Column 12, line 49; delete "heat-treating".

Column 12, line 52; change "heattreating" to ---heat-treating---.

Signed and Sealed this

First Day of March 1977

[SEAL]

Attest:

RUTH C. MASON
*Attesting Officer*

C. MARSHALL DANN
*Commissioner of Patents and Trademarks*